United States Patent [19]
Brandstetter et al.

[11] Patent Number: 5,547,786
[45] Date of Patent: Aug. 20, 1996

[54] SYSTEM AND METHOD OF FABRICATING MULTIPLE HOLOGRAPHIC ELEMENTS

[75] Inventors: Robert W. Brandstetter, Levittown; Nils J. Fonneland, Lake Ronkonkoma, both of N.Y.

[73] Assignee: Northrop Grumman Corporation, Los Angeles, Calif.

[21] Appl. No.: 294,199

[22] Filed: Aug. 22, 1994

Related U.S. Application Data

[63] Continuation of Ser. No. 957,593, Oct. 6, 1992, abandoned.
[51] Int. Cl.$^6$ .................................................. G03H 1/20
[52] U.S. Cl. ........................... 430/1; 430/2; 359/12; 359/15; 359/20; 359/19; 359/25
[58] Field of Search ........................... 430/1, 2; 359/12, 359/15, 20, 25, 885, 19

[56] References Cited

U.S. PATENT DOCUMENTS

| | | | |
|---|---|---|---|
| 3,658,526 | 4/1972 | Haugh | 430/02 |
| 3,779,492 | 12/1973 | Grumet | 359/20 |
| 4,111,519 | 9/1978 | Gillis et al. | 359/888 |
| 4,735,486 | 4/1988 | Lieb | 359/19 |
| 4,857,425 | 8/1989 | Phillips | 430/01 |
| 4,904,033 | 2/1990 | Ikeda et al. | 359/12 |
| 4,942,112 | 7/1990 | Monroe et al. | 430/02 |
| 5,162,927 | 11/1992 | Moss et al. | 359/15 |
| 5,185,815 | 2/1993 | Brandstetter | 359/29 |

FOREIGN PATENT DOCUMENTS

| | | | |
|---|---|---|---|
| 767176 | 5/1970 | Belgium | 430/2 |
| 0077925 | 10/1981 | European Pat. Off. | 359/12 |
| 1204169 | 9/1970 | United Kingdom . | |
| 1291430 | 10/1972 | United Kingdom . | |
| 1326313 | 8/1973 | United Kingdom . | |
| 1342480 | 3/1974 | United Kingdom . | |

OTHER PUBLICATIONS

Nakejima et al "Copied Phase Hologram of Photoresist" Fujitsu Sci. tech., J. Sep. 1970 pp. 69–90.
Beesley et al "The Use of Photoresist as a Holographic Recording Medium." Appl. Opt. 9 (Dec. 1970) 2720–2724.
Smothers, W. et al., "Photopolymers For Holography" proceeding SPIE Conference on Practical Holography IV, vol. 1212, 1990.
Weber, A., et al., "Hologram Recording in DuPont's New Photopolymer Materials," proceeding SPIE Conference on Practical Holography IV, vol. 1212, 1990.
Weber, A., "HRF-600 and HRF-610 Films", DuPont Imaging Systems FAX dated Mar. 8, 1991.
Brandstetter, R., et al., "Photopolyer Applications for Radio Frequency Recording and Processing," SPSE Conference, Washington, D.C., 1978.

(List continued on next page.)

Primary Examiner—Charles L. Bowers, Jr.
Assistant Examiner—Martin Angebranndt
Attorney, Agent, or Firm—Terry J. Anderson; Karl J. Hoch, Jr.

[57] ABSTRACT

A method and system for fabricating a multiple holographic element. The method comprises the steps of forming a master multiple holographic element having an absorption grating pattern that produces a given index of refraction pattern across the master multiple holographic element, coating the master holographic element with a layer of a photopolymer, and directing a recording beam to and through the master holographic element and into the photopolymer layer. The absorption grating pattern of the master holographic element modulates the amplitude of the recording beam, and the modulated recording beam causes the monomers of the photopolymer to form a monomer pattern that produces the given index of refraction pattern across the photopolymer layer. The method further comprises the steps of fixing the monomers of the photopolymer layer in that monomer pattern to form thereby a copy of the multiple holographic element, and removing the photopolymer layer from the master holographic element.

7 Claims, 13 Drawing Sheets

OTHER PUBLICATIONS

Kogelnik, H., "Coupled Wave Theory for Thick Hologram Gratings," *Bell System Technical Journal*, vol. 48, No. 9, Nov. 1969.

Brandstetter, R. W. and Fonneland, N. J., "Photopolyer Elements for an Optical Correlator System" Grumman Aerospace Corporation.

Gambogi, et al., "Holographic Transmission Elements Using Improved Photopolymer Films," SPIE International Symposium on Optical Science and Engineering, San Diego, 1991.

Brandstetter, R. W., et al., "Electronic Countermeasures Signal Recognition—Brassboard Development and Test," Grumman Aerospace Corp. ADR 17–08–80.1, Apr. 1980.

Brandstetter, R. W., et al., "Electronic Countermeasures (ECM) Signature Recognition," GAC–ADR 177–08–77.1, Oct. 1977.

Pernick, B. J., et al., "Corporate Research Center Multiple Holographic Lens Facility," Grumman Corporate Research Center, Report RM–861, Aug. 1987.

Sullivan, E., et al., "An Improvement to the MHL Facility Optical System," Grumman Corporate Research Center, Research Note RN–501, Sep. 1983.

SYSTEM AND METHOD OF FABRICATING MULTIPLE HOLOGRAPHIC ELEMENTS

This is a continuation of application Ser. No. 957,593 filed on Oct. 6, 1992, now abandoned.

BACKGROUND OF THE INVENTION

This invention generally relates to methods and systems for fabricating holographic elements; and more specifically, to a method and system for fabricating a copy of a multiple holographic element.

Holographic optical elements are fabricated by the recording of a coherent laser reference beam with a coherent laser signal beam to form a hologram in a photographic recording material. More specifically, in the construction of holographic optical elements, a pair of collimated construction beams, referred to as the signal beam and the reference beam, respectively, are projected so that they overlap, at a relative angle to each other, on a recording medium, producing an optical interference pattern that is recorded in the medium as an amplitude and/or phase distribution of closely spaced lines. The signal beam may be spatially modulated by passing it through an image of a selected object; and the signal and reference beams then combine at the recording medium to produce a diffraction pattern, or hologram, unique to the selected object. Preferably, the construction beams are from the same source of coherent electromagnetic radiation, which, for example, may be a laser. The recording medium, as is well-known, can be a photographic emulsion, dichromated gelatin, a photopolymer and the like, and can be coated or mounted on a suitable substrate such as a glass plate or a thin film.

A hologram may be used, or played back, by directing a collimated beam, referred to as the playback beam, through the recorded hologram. The hologram diffracts the playback beam and produces, at a given distance and angle from the hologram, an image of the image used to spatially modulate the signal beam employed to fabricate the hologram.

For many applications, it is beneficial to form multiple holograms on one recording medium; and typically, this is done by one of two procedures, referred to as the step and repeat process, and the parallel or coherent process, respectively. In the former process, the holograms are formed one at a time in the recording medium. This may be done, for example, by directing the signal beam through an image and then onto the recording medium to form a first hologram in the recording medium, and repeating this step a multitude of times, each time with the signal beam being directed to the same recording medium. In the parallel process of forming a multiple holographic element, the multiple holograms are all formed simultaneously. This may be done by separating the signal beam into a matrix of component beams, and directing a single image onto the recording medium to form the multiple holograms therein.

As a general rule, multiple holographic elements made by the step and repeat process have a high accuracy but a low efficiency, while multiple holographic elements made by the parallel process generally have a high efficiency but a low accuracy. To elaborate, the efficiency of a multiple holographic element is measured as the ratio of the power of the input playback beam to the power of the combined first order output beams of the hologram, and the accuracy of a hologram is measured as the ability of the element to reproduce accurately the image used to form the hologram.

In a multiple holographic element made by the step and repeat process, each hologram, because it is made separately, shares the same medium as the other holograms on the element and is able to reproduce with a high degree of accuracy the image used to form the hologram. However, because each hologram is allotted only a part of the dynamic range of the recording medium, the efficiency of the hologram is low. In a multiple holographic element made by the parallel process, because each hologram shares in the overall dynamic range of the recording medium, the hologram has a comparatively high efficiency. However, the holograms also overlap in their sharing of the dynamic range of the recording medium, and each hologram may appreciably distort its neighboring hologram. When a given hologram is played back, the distortions in the hologram caused by sharing the dynamic range of all the holograms on the recording, may appreciably reduce the ability of the given hologram to reproduce accurately the image used to form the given hologram.

SUMMARY OF THE INVENTION

An object of this invention is to fabricate a high accuracy and high efficiency multiple holographic element.

Another object of the present invention is to obtain the quality performance of a step and repeat holographic optical element and also obtain high efficiency without the sacrifices associated with the parallel type holographic element.

A further object of this invention is to make an enhanced recording of a step and repeat holographic element using a contact replication process to transfer the low efficiency recording of the holographic optical element onto a photopolymer or other suitable material, and by optimum exposure, to obtain a high efficiency lens with the same good optical qualities of the step and repeat holographic optical elements.

A still another object of the present invention is to increase the diffraction efficiency of a silver halide absorptive holographic optical element by converting it to a phase recording, and in so doing, effectively amplifying the amount of index change in the fringe pattern produced by the silver halide thereby to increase the amount of light that is diffracted into the first order which comprises the holographic optical element lens.

These and other objectives are obtained with a method and system for fabricating a multiple holographic element. The method comprises the steps of forming a master multiple holographic element having an absorption grating pattern across the master multiple holographic element, coating the master holographic element with a layer of a phase recording material, and directing a recording beam to and through the master holographic element and into the layer of the phase recording material. The absorption grating pattern of the master holographic element modulates the intensity of the recording beam, and the modulated recording beam causes the monomers of the phase recording material to form a monomer pattern that, when polymerized, produces a desired index of refraction pattern across the layer of the phase recording material. The method further comprises the steps of fixing the monomers of the layer of the phase recording material in that monomer pattern to form thereby a copy of the multiple holographic element, and removing the photopolymer layer from the master holographic element.

Preferably, the master holographic element is formed by a step-and-repeat process. In particular, this holographic element is formed by transmitting a reference beam to an optical recording medium, transmitting a signal beam from a beam source to the recording medium and at an angle $\Theta$ to the reference beam, and moving the recording medium incrementally, to a multitude of positions, thus recording a selected number of holograms in the recording medium. In this way, the reference and signal beams interfere at these different locations of the recording medium to form the master multiple holographic element.

When this preferred master holographic element is used in the fabrication method and system of the present invention, preferably the amplitude of the recording beam across the master multiple holographic element is varied according to the equation:

$$|A_c|^2 = |A|^2 \cos \Theta,$$

where $A_c$ is the amplitude of the recording beam at any selected point on the master holographic element, $A$ is the maximum amplitude of the recording beam on the master holographic element, and $\Theta$ is the above-mentioned angle between the signal and reference beams used to record the holograms in the master holographic element.

Further benefits and advantages of the invention will become apparent from a consideration of the following detailed description given with reference to the accompanying drawings, which specify and show preferred embodiments of the invention.

DETAILED DESCRIPTION OF THE PREFERRED EMBODIMENTS

The present invention is a method of fabricating a copy of a multiple holographic optical element—that is, a copy in the sense that when the copy is played back, it will produce the same image as the original optical element will produce when it is played back—and the invention is particularly well-suited for fabricating a high accuracy, high efficiency multiple holographic optical element from a high accuracy, low efficiency multiple holographic optical element. As will be understood by those of ordinary skill in the art, however, the invention in its broadest sense may be used for other purposes; and in particular, this invention may be used simply to produce functional copies of a multiple holographic element, without regard to whether the copy is more efficient or more accurate than the original holographic element.

Figure 1:
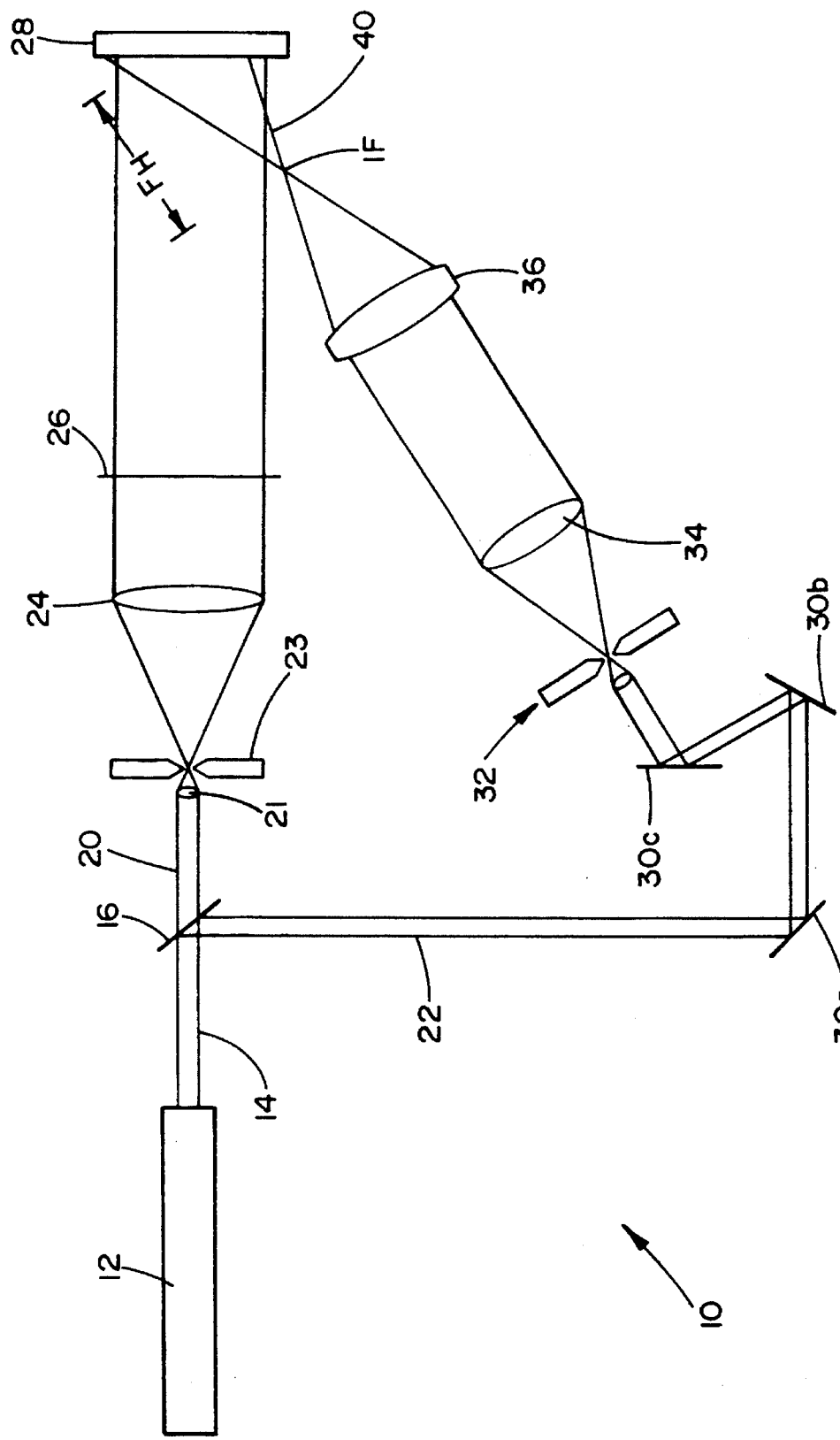
FIG. 1 is a schematic drawing of a system for making a master holographic element.
Figure 2:
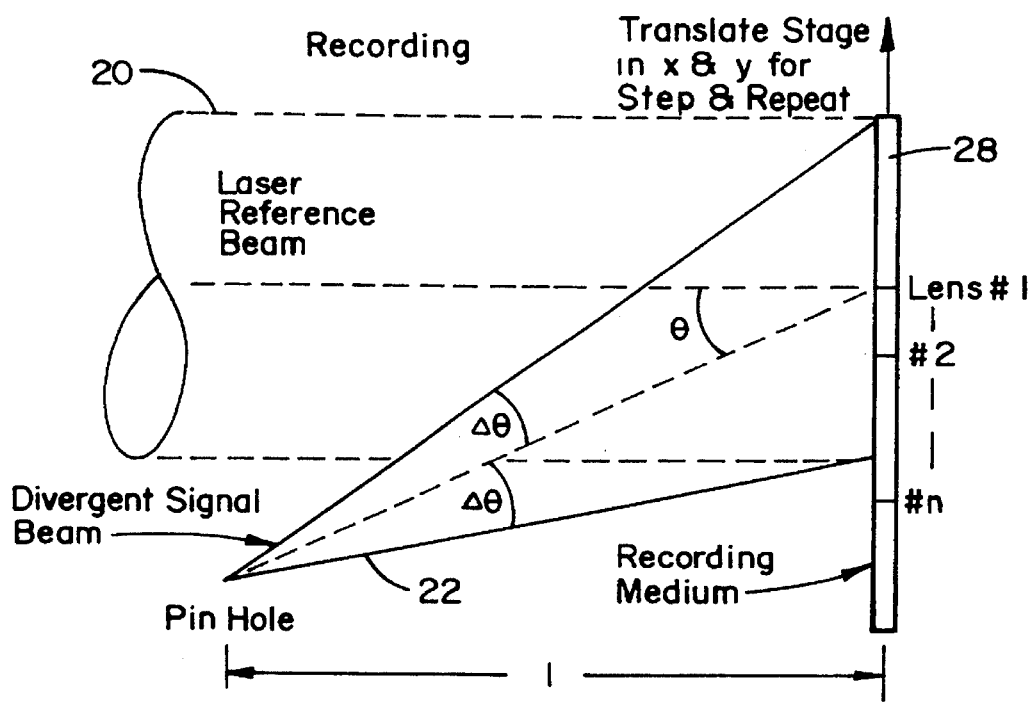
FIG. 2 is an enlarged view of a portion of the system of FIG. 1.

In order to understand how the present invention may be best utilized to make a copy of a multiple holographic optical element, it may be helpful to review the procedure by which an original, or master, multiple holographic optical element is made, and FIGS. 1 and 2 generally illustrate a process for making such a master optical element. More specifically, FIG. 1 illustrates system 10 for fabricating a multiple holographic element using a step and repeat process; and in system 10, laser 12 generates laser beam 14 and directs that beam onto beam splitter 16, which splits the beam into reference and signal beams 20 and 22. Reference beam 20 is directed from beam splitter 16, through beam conditioning means which comprises an expanding lens 21, pinhole 23, and a collimating lens 24 and variable attenuation filter 26 and then onto recording medium 28. The signal beam 22 from beam splitter 16 is reflected off of mirrors 30a, 30b, and 30c and is then passed through beam expansion means 32 and collimating lens 34. The collimated beam is then passed through a refractive lens 36. Lens 36 is placed such that its output expanding beam 40 is incident on the recording medium 28 such that beam 40 interferes with reference beam 20 and forms a fringe pattern at the recording medium. The focal length $F_H$ of holographic lens is determined by the distance of medium 28 from the focus 1F of lens 36.

As shown in FIGS. 1 and 2, the axis of reference beam 20 is normal to the plane of recording medium 26, and the axis of signal beam 22 forms an angle $\Theta$ with the normal to the plane of the recording medium.

To form a multitude of holograms on recording medium 28, that recording medium is moved through a series of positions in a step-wise manner; and at each position of the recording medium, signal beam 22 interferes with reference beam 20 over a respective area of the recording medium, producing a multitude of diffraction patterns, or holograms, on the recording medium, with each hologram generally centered about a respective one point in the recording medium. In the formation of each of these holograms, the axis of the signal beam forms an angle Θ with the normal to the plane of the recording medium, and each hologram is thus said to be formed at an angle Θ.

Figure 3:
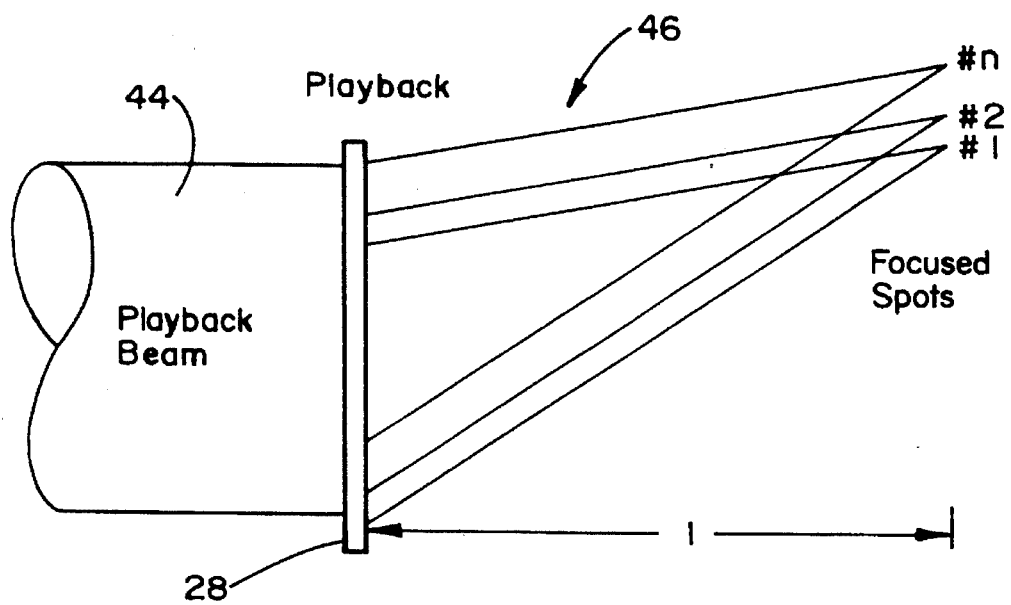
FIG. 3 is a schematic drawing illustrating the master holographic element being used or played back.

After the multiple holographic element 28 is completed, it can be played back; and with reference to FIG. 3, this is done by directing a collimated beam 44 onto the element 28. Each hologram of element 28 diffracts the incident beam 44, resulting in a multitude of output beams 46, each of which is focused on a respective one spot. These focus spots are all in one plane, referred to as the back focal plane of element 28, a distance f from that optical element. For instance, a holographic optical element that has sixteen holograms arranged in a 4×4 matrix would have sixteen output beams; and a holographic optical element that has only one hologram, which may be referred to as a 1×1 hologram, would have one output beam.

Because element 28 was made by a step and repeat process, that element has a high accuracy but a low efficiency. The efficiency of element 28 is defined as the ratio of the power of the input playback beam to the combined power of the first order output beams. The efficiency of a step and repeat holographic optical element is limited by the fact that the dynamic range of the optical element is shared by all of the recordings made on that optical element. Thus, for instance, each hologram of a 4×4 holographic optical element is allotted a dynamic range of 1/16 of the total dynamic range of the whole holographic optical element.

Figure 4:
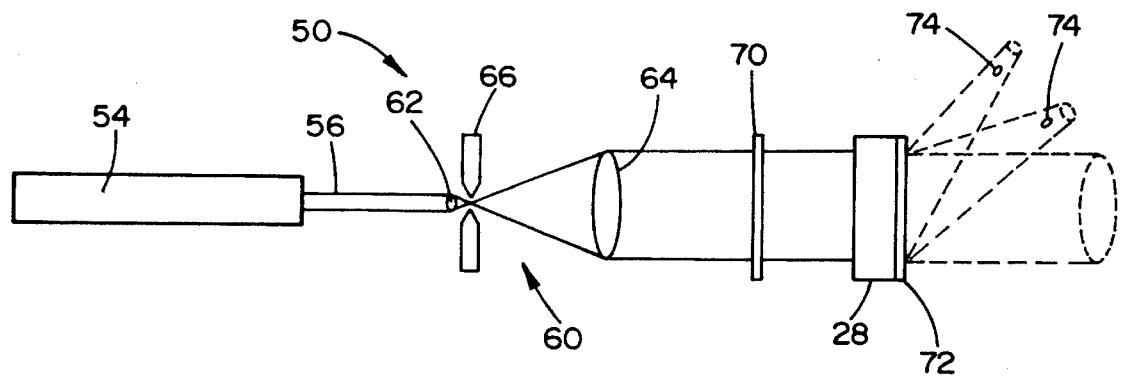
FIG. 4 is a schematic drawing of a system for fabricating a copy of the master holographic element.

The general objective of this invention is, in effect, to increase the diffraction efficiency of element 28. More specifically, this is done by converting the diffraction pattern in element 28 from a low efficiency amplitude and/or phase recording to a second holographic optical element, and effectively amplifying that low modulation index change thereby increasing the amount of light that is diffracted onto the first order output beams of that second holographic optical element. FIG. 4 shows system 50 for fabricating this second holographic optical element from element 28.

In system 50, a source of monochromatic collimated light energy of substantially fixed wavelength such as laser 54 produces an output beam 56, referred to as the replication or recording beam, and directs that beam through beam conditioning means 60, which preferably comprises lenses 62 and 64, pinhole 66, and filter 70. Lenses 62 and 64 and pinhole 66 are provided to collimate beam 56 and to expand that beam 20 the desired size; and filter 70 is provided to control or to adjust the intensity or amplitude of beam 56 across its profile, referred to as the x,y direction, as desired. From conditioning means 60, the conditioned beam 56 is directed at a desired angle onto master holographic optical element 28, passes therethrough, and directly enters a phase recording medium 72, such as a photopolymer layer that has been applied onto the backside of the master holographic optical element.

As the replication beam 56 passes through optical element 28, that beam is amplitude and phase modulated by the diffraction pattern contained in optical element 28, and this modulation is directly coupled to medium 72. In particular, as replication beam 56 passes through master holographic element 28, the amplitude of that replication beam is modulated such that the replication beam has a given amplitude or intensity profile in the x,y direction. From the master holographic element 28, the amplitude modulated replication beam 56 passes directly into and through the medium 72; and as this happens, the monomers of medium 72 migrate into areas of lower light intensity, tending to produce a monomer intensity profile across medium 72 that is the inverse of the intensity profile beam 56 produced by master holographic optical element 28. The index of refraction through medium 72 varies inversely with the monomer density thereof, so that the above-described monomer profile tends to produce an index of refraction profile across medium 72 that replicates the intensity profile of beam 56 produced by master optical element 28.

Once the desired monomer density pattern is produced in medium 72, the transmission of the recording beam 56 through that medium is discontinued or terminated. Then, the monomers of the photopolymer 72 are polymerized to fix the monomers, and thereby form a permanent record of the monomer pattern in the photopolymer, and the photopolymer is removed from the master recording elements 28.

The recording in the photopolymer 72 is a pure phase recording in a non absorptive medium; and thus, when the photopolymer is played back, there is virtually no attenuation by the photopolymer of the amplitude of the play back beam.

Figure 5:
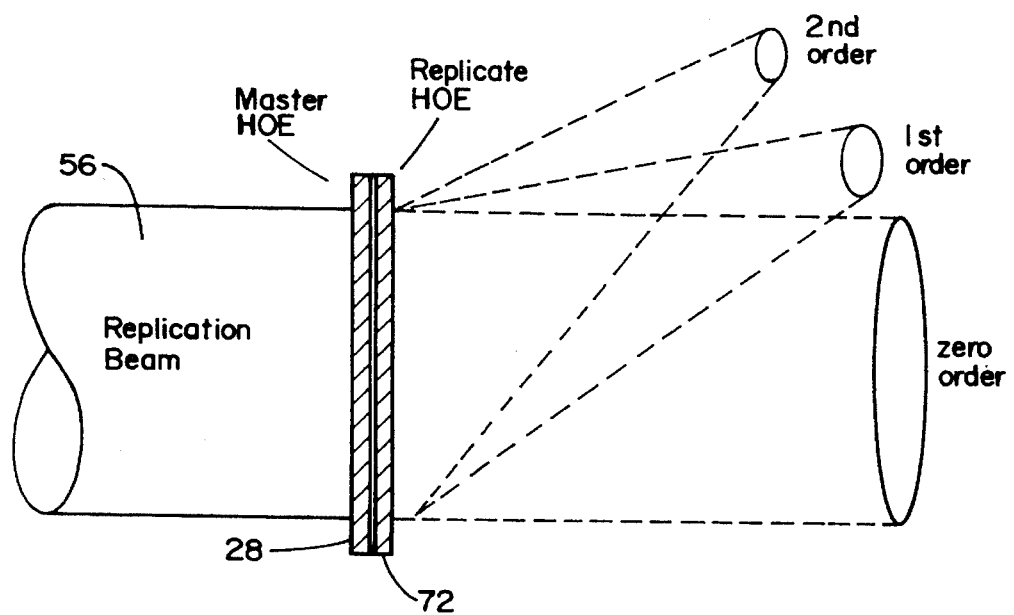
FIG. 5 is an enlarged view of a portion of the system of FIG. 4.

With reference to FIGS. 4 and 5, preferably, sensors 74 are provided to monitor the power in the first and higher order output beams of photopolymer layer 72 as the recording is in process, and the recording is concluded when a maximum power is obtained in the first order output beam and a desired minimum power is obtained in the higher order output beams. For instance, output signals from these sensors 74 may be monitored by an operator, who manually deactivates laser 54 when the desired output beam powers are obtained. Alternatively, these sensors may be connected to laser 54 to deactuate the laser automatically when the output beams of photopolymer 72 reach the desired power levels. Also, a trial copy holographic element may be made first, with a time history taken of the power levels of the various orders of output beams. This produces a histogram that allows an exposure to be selected that would yield the desired efficiency and distributions of the first and higher order output beams of the photopolymer layer. These data would then be used to fabricate an optimized holographic optical element.

Any suitable photopolymer may be used as recording medium 72; and for example, one suitable photopolymer is sold by DuPont, Inc., under the trademark HRF 600 OMNI-DEX. The photopolymer may be poured onto master holographic element 28 and then cured in place, or a cured photopolymer film strip can be directly rolled onto the emulsion side of master element 28. Conventional techniques may be used to polymerize the photopolymer and to remove the photopolymer from the master holographic element 28.

The present invention will be clear to those of ordinary skill in the art from a review of the above discussion. The following analysis may help explain the benefits and advantages of this invention, and how to optimize those benefits and advantages.

When a plane wave hologram (a sine wave grating) that consists of an absorptive grating is formed in a thin holographic element, the periodicity, a, of the grating across the width of the holographic element, referred to herein as the y-direction, is described by the equation:

$$a = a_0 + a_1 \sin\left[2\pi \frac{y}{S}\right] \quad (1)$$

where $a_0$ is the average absorption of the grating, $a_1$ is the peak absorption level of the grating, and $1/S$ is the spatial frequency of the grating along the y-axis.

It is also known that the efficiency, $\eta$, of this absorptive grating is given by the equation:

$$\eta = \exp[-2a_0 d/\cos\theta] \sin h^2[a_1 d/2 \cos\theta] \quad (2)$$

where d is the thickness of the optical element, and $\Theta$ is the angle from the normal of the reference beam employed to fabricate the optical element.

When $\Theta$ equals zero, which is the case in the system of FIGS. 1 and 2, the $\cos\Theta$ equals one, and equation (2) becomes:

$$\eta = \exp[-2a_0 d] \sin h^2[a_1 d/2] \quad (3)$$

$\eta$ is a maximum when $a_0$ equals $a_1$; and when this is the case, and for an optical element having a thickness of twenty microns, the maximum efficiency of the grating is about 3.67%.

The above-discussion is based on the premise that the angle $\Theta$ is fixed. With more complex holograms such as those formed in lens applications, a second angle $\psi$ would also be included. Both of these angles $\Theta$ and $\psi$ would vary from point to point in the recording and in fact cause a reduction in the efficiency of the holographic optical element. This reduced efficiency is due to the fact that the spatial frequency $1/S$ of the grating along the y-axis is a function of both $\Theta$ and $\psi$. In particular the spatial frequency is given by the equation:

$$\frac{1}{s} = \frac{2\sin\theta\sin\psi}{\lambda} \quad (4)$$

where $\lambda$ is the wavelength of the reference beam.

Figure 6:
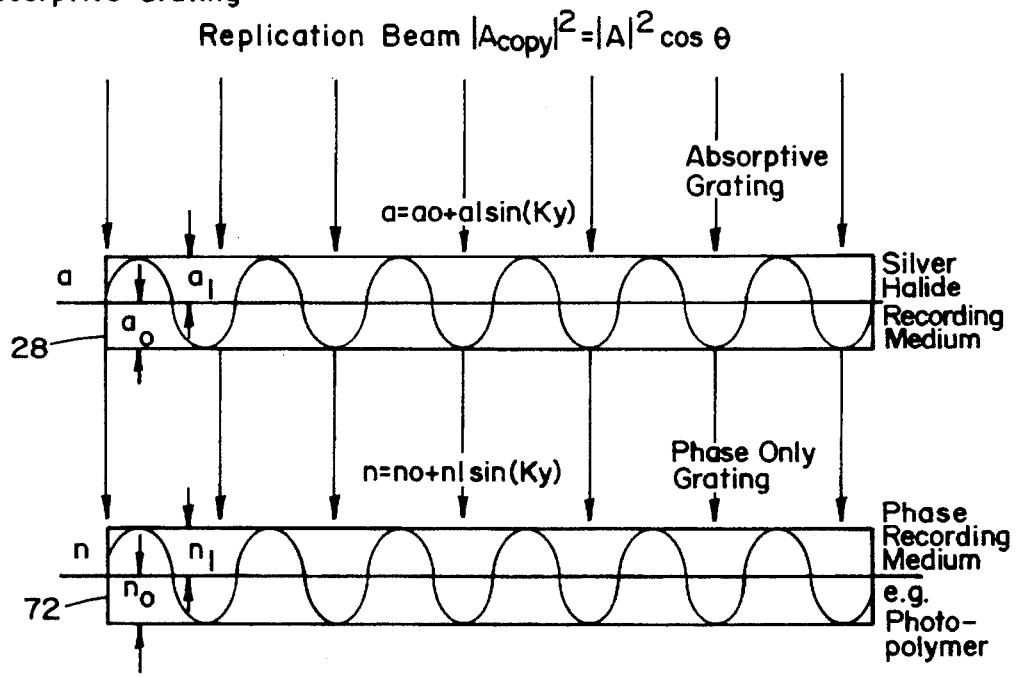
FIG. 6 shows, in outline form, the master holographic element and the copy made therefrom, and illustrates how the phase grating of the copy is produced by the replication beam and the absorptive grating of the master holographic element.

FIG. 6 is a diagrammatic view illustrating multiple holographic element 28 and photopolymer layer 72, and also including, superimposed over those elements, graphs of several parameters of interest. In particular, FIG. 6 includes a graph of the periodicity, a, of the grating of element 28, as given by equation (1), superimposed over an outline of the master multiple holographic element 28; and this Figure includes a graph of the index of refraction, n, or photopolymer 72, superimposed over an outline of that element.

With reference to FIG. 6, when the master optical element 28 is illuminated by the replication or copy beam, which passes through the absorptive grating described by equation (1), the intensity of that copy beam is modulated by the absorptive grating of the master optical element. This modulated copy beam is brought incident onto photopolymer material 72, where, in effect, the absorptive grating of element 28 is converted to a phase only index modulated grating.

In the case of a thin photopolymer layer 72, the phase, $\phi$, of the phase grating across the width of layer 72 can be described by the equation:

$$\phi = \phi_0 + \phi_1 \sin(Ky) \quad (5)$$

where $\phi_0$ is some fixed phase shift, $\phi_1$ is the maximum phase shift in the phase grating, and $$K = \frac{2\pi}{S}$$

This phase grating may be created by an index modulation, n, given by the equation $$n = n_0 + n_1 \sin(Ky) \quad (6)$$

where $n_0$ is the average index modulation, $n_1$ is the maximum index modulation, and $$K = \frac{2\pi}{S}$$

The phase shift, $\phi$, is related to the index modulation, n, by the ratio:

$$\frac{\phi}{2\pi} = \frac{nd}{\lambda} \quad (7)$$

where $$\frac{d}{\lambda} = \text{integer} + \Delta \quad (8)$$

and $\Delta$ is some fraction.

Solving equation (7) for $\phi$ shows that:

$$\phi = \frac{2\pi n d}{\lambda} \quad (9)$$

so that equation (5) can be rewritten as:

$$\phi = \frac{2\pi n_0 d}{\lambda} + \frac{2\pi n_1 d}{\lambda} \sin(Ky) \quad (10)$$

The transmittance function, $T_{(y)}$, of the grating is:

$$T_{(y)} = e^{-j\phi} = T_{(y)} = e^{-j(\phi_0 + \phi_1 \sin(Ky))} \quad (11)$$

This can be evaluated by the Bessel function $$T_{(y)} = e^{-j\phi_0} e^{-j\phi_1 \sin(Ky)} = e^{-j\phi_0} \sum J_{n(\phi_1)} e^{jm(Ky)} \quad (12)$$

Expanding equation (12) yields:

$$T_{(y)} = e^{-j\phi_0}[J_0(\phi_1) + J_1(\phi_1)e^{jKy} + J_2(\phi_1)e^{2jKy} + \ldots] \quad (13)$$

In general, for $\hat{n}=0$ or a positive integer each term in the bracket in equation (13) can be expressed by the following equation $$J_{\hat{n}}(\phi_1) = \sum_{m=0}^{\infty} \frac{(-1)^m \phi_1^{\hat{n}+2m}}{2^{\hat{n}+m} m! (\hat{n}+m)!} \quad (14)$$

where $\hat{n}$ is the order of the Bessel function and m is the term in the series.

This is a Bessel function of the first kind which can be expanded from equation (14). For example, $J_0(\phi_1)$ and $J_1(\phi_1)$ are given by the equations:

$$J_0(\phi_1) = 1 - \frac{\phi_1^2}{2^2} + \frac{\phi_1^4}{2^2 4^2} - \frac{\phi_1^6}{2^2 4^2 6^2} + \ldots \quad (15)$$

$$J_1(\phi_1) = \frac{\phi_1}{2} - \frac{\phi_1^3}{2^2 4} + \frac{\phi_1^5}{2^2 4^2 6} - \ldots \quad (16)$$

where the value of $\phi_1$ is obtained from equation (9).

To evaluate the transmittance function described by equation (12), it is necessary to solve for each term of the series expansion or by numerical integration. For the phase grating formed in photopolymer 72, $J_0(\phi_1)$ is the DC or zero order output beam of the grating, $J_1(\phi_1)$ is the first order output beam of the grating and $J_2(\Theta_1)$ and higher terms of the series are the second and higher order output beams of the grating. The zero order and first order output beams of the photopolymer are the beams of primary interest, and hence the zero and first order terms of equation (12) are the terms of primary interest. The values for $J_0(\phi_1)$ and $J_1(\phi_1)$ are tabulated so that it is only necessary to calculate $\phi_1$ and then look up the Bessel function of interest for that value, or to calculate that value using a computer program such as Matlab.

As previously mentioned, one suitable photopolymer 72 is sold under the trademark HRF-600 OMNIDEX, and the value of n for this photopolymer is 0.14. Substituting this value for n in equation (9) and substituting 10μ and 0.633μ for d and λ, respectively, in equation (9) yields the following $$\phi_1 = \frac{2\pi(.014)(10\mu)}{.633\mu} = 1.39$$

Once $\phi_1$ is determined, $J_0(\phi_1)$ and $J_1(\phi_1)$ can be determined from equations (15) and (16). In particular, with $\phi_1=1.39$, equations (15) and (16) show that $$J_0(\phi_1) = 0.5728 e^{-j*0} \tag{17a}$$

$$J_1(\phi_1) = 0.5399 e^{jk_y} * e^{-j*0} \tag{17b}$$

Since the transmittance terms for the zero and first orders are known, the efficiency of the grating can be calculated by passing through the grating a light beam having a power of one unit (μ=1).

The zero order value, $\mu J_0(\phi_1)_1$ is $$\mu J_0(\phi_1) = 1*(0.5728 e^{-j*0}) \tag{18}$$

and the first order value, $\mu J_1(\phi_1)$ is $$\mu J_1(\phi_1) = 1*(0.5399 e^{j(k_y - *0)}) \tag{19}$$

The above equations show the amplitude and phase emanating from the grating, which is described by $J_0(\phi_1)$ and $J_1(\phi_1)$. The efficiency of the fabricated copy holographic element relates to the light power, or the square of the amplitude, of the output beam relative to the power of the playback beam, and the efficiency, η, is given by the equation $$\text{efficiency} = \eta = |J_1(\phi_1)|^2 = 0.29 \tag{20}$$

Figure 7:
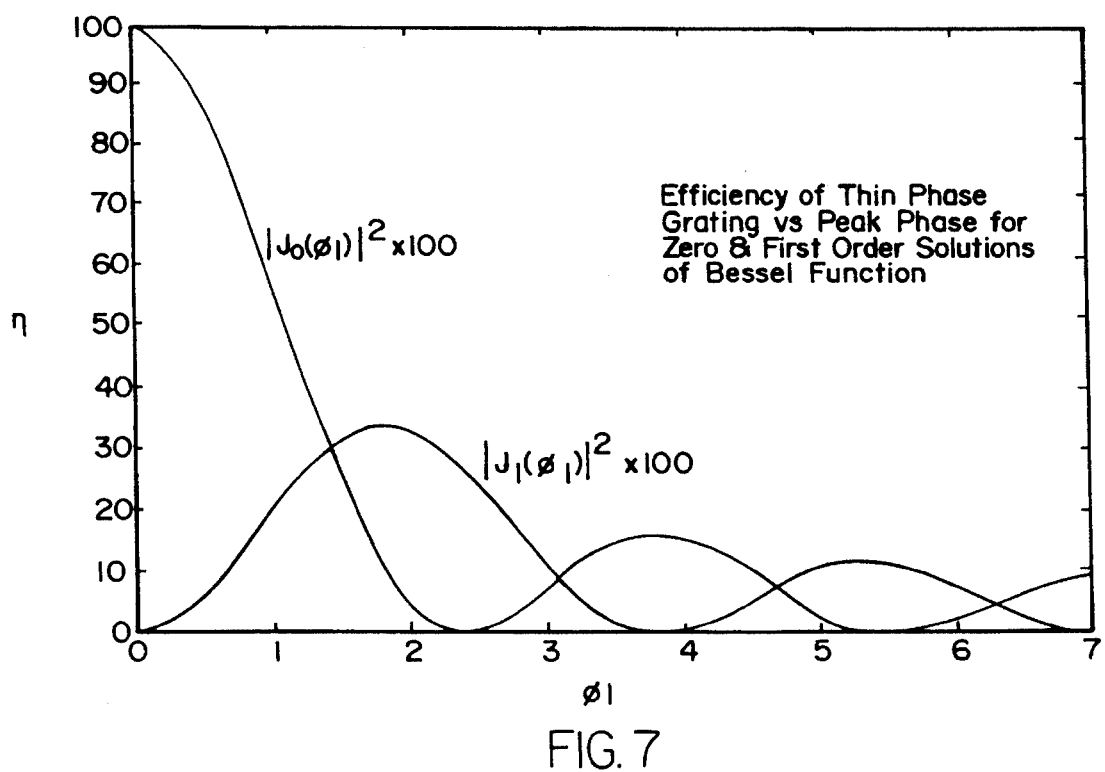
FIG. 7 illustrates how, for a thin copy holographic element, the efficiencies of the zero order and first order output beams of the copy holographic element vary according to the phase grating of the copy.

The efficiencies of the zero order and first order output beams of holographic element 72—or more precisely, the ratio of the intensity of the zero order output beam of element 72 to the intensity of the playback beam—as derived from the zero and first orders of the Bessel function, is plotted in FIG. 7. As shown therein, for $\phi_1=1.39$, the efficiencies of the zero and first order output beams are about equal. The maximum efficiency of the first order output beam is about 34%, which is obtained when $\phi_1$ is about 1.8; and at this value of $\phi_1$, the efficiency of the zero order output beam is about 10%.

It should be noted that, for a thin grating formed in photopolymer 72, higher order output beams appear on both sides of the zero order output beam, and the total output power of the photopolymer can be calculated by summing the powers of all the orders of output beams. This is equivalent to solving equation (12) for one value of $\phi_1$ for all values of n and m and squaring the amplitude of that result. Moreover, this total output power should equal the total input power, since there are no absorptive losses in the grating of photopolymer 72.

In laboratory experiments, we have obtained contact replication of holographic optical elements using these parameters with efficiencies ranging from 20 to 30%, which is in agreement with the above analysis for thin gratings.

The distinction between thick and thin holograms is determined from the following equation:

$$Q = \frac{2\pi\lambda d}{n\Lambda^2} \tag{21}$$

where d is the thickness of the film, n is the index of the film, and

Λ is the spacing of the fringes in the film (1/S).

In particular, if Q≤1, the grating is considered to be thin; and if Q>>1, the grating is considered to be thick.

For the values, λ=0.514μ, d=10μ, n=1.5, and Λ=1.82×10⁻³μ, $$Q = \frac{2\pi \cdot 0.514\mu \cdot 10\mu}{1.5 \cdot 1.82 \times 10^{-6}} = 6.5$$

This places the grating thickness somewhere between the thick and thin criterion, and therefore both situations have to be considered.

The efficiency, η, of a thick grating, using the Kogelnik coupled wave solution for a thick grating, is given by the equation:

$$\eta = \sin^2\left(\frac{\pi n_1 d}{\lambda \cos(\theta)}\right) \tag{22}$$

using the above-given values for n, d, λ and Θ, yields η=42%. This efficiency is higher than that determined when the grating is considered to be thin, and is higher than that observed in the laboratory, suggesting that the results given by equation (13) apply in the present case.

As is apparent from equation (20), for a thin holographic optical element, the efficiency of the holographic element is a function of $\phi_1$. The peak phase term in equation (5) is controlled by the index modulation term $n_1$ in equation (6); and therefore the maximum efficiency of the holographic element 72, as well as the uniformity of the efficiency of the holographic element, are functions of this $n_1$ term, through modulation of the replication beam.

Also, from equation (2), it is apparent that the efficiency of the absorptive grating in master holographic element 28 is a function of the angle Θ of the reference beam to the normal of the optical element from which the holographic element is made; and in particular, that efficiency, η, varies inversely with cos Θ. Changes in the angle Θ can be compensated for by adjusting or controlling the intensity of the replication beam in the x,y direction—that is, across the profile of the replication beam—so that the effective efficiency of the fabricated holographic optical element can be maintained at a maximum for all Θ.

The required replication beam corrections or adjustments can be quite simple or complex, depending upon how Θ varies. For example, for the lens 28 made in the system of FIG. 1, Θ varies in a symmetrical manner without inflections, and a modified Gaussian filter can be used in the system of FIG. 4 to provide the desired adjustments to the intensity profile of the copy beam. For more complicated functions of Θ, such as asymmetric functions with inflections, the beam profile filter of system 50 would be more complicated.

Even more specifically, with reference to FIGS. 4–6, the desired optimum efficiency of the copy holographic element can be obtained by varying the amplitude of the replication beam across the face of the master multiple holographic element 28 according to the equation:

$$|A_{copy}|^2 = |A|^2 \cos\theta \tag{23}$$

where $|A_c|$ is the amplitude of the recording beam at any selected point on the master holographic element, $|A|$ is the maximum intensity of the recording beam incident on the master holographic element, and $\Theta$ is the angle between (i) the normal of the recording medium from which holographic element 28 was made, and (ii) the reference beam used to form the hologram in element 28 at the selected point.

As an example, using equation (22), and using the following parameters:

$$d=20\mu \; n_1=0.017 \; \lambda=0.033\mu \; \Theta=0$$

a grating can theoretically deliver 100 efficiency as shown below $$\eta - \sin^2\left(\frac{\pi \cdot 0.017 \cdot 20\mu}{0.633\mu}\right) \cdot 100 = 99\%$$

When $\Theta$ is greater than zero and is not fixed, then the terms in equation (22) that can change are $\Theta$ and $n_1$, and the other terms are fixed. It should also be noted that the cos $\Theta$ in the denominator of equation (22) changes with recording angle. Thus, for instance, in the case of 100 mm holographic optical element lens formed on a 4×4 inch plate and made at a nominal $\Theta_0=10°$, the recording angle can actually vary between +36.6 and −26.6 from the center of the plate to the edges. The cosines of these angles are:

cos $\Theta_0$=0.98 cos(−26.6)=0.89 cos(36.6)=0.8

Figure 8B:
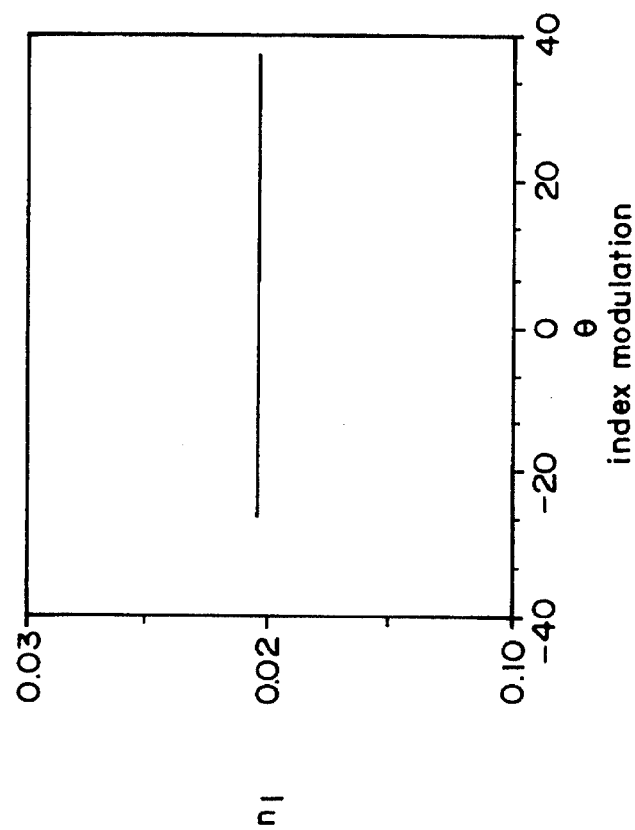
FIGS. 8a–8d show various parameters of interest when a recording beam having a constant amplitude across its profile is used in the system of FIG. 4 to make a copy holographic element.
Figure 8A:
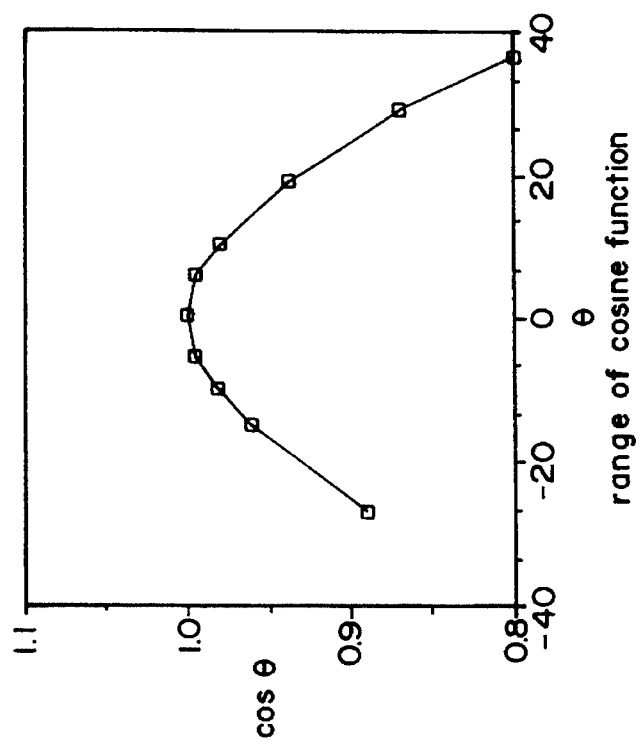
Figure 8D:
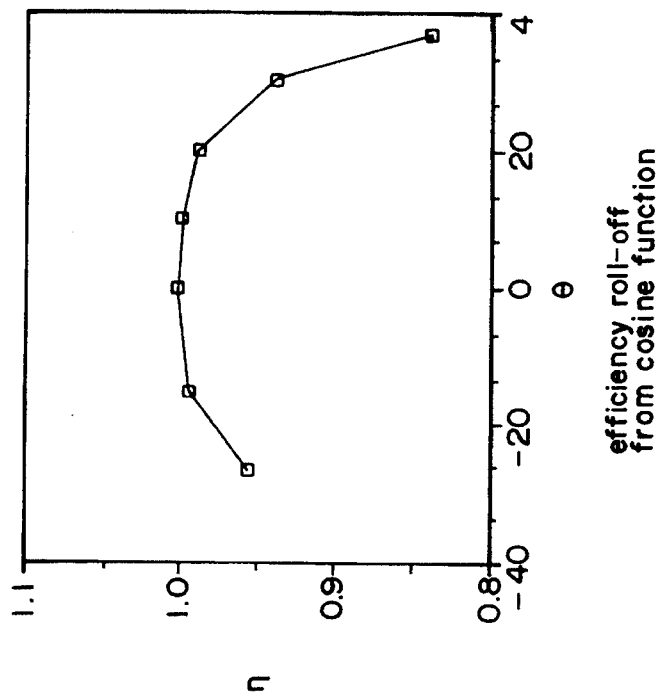
Figure 8C:
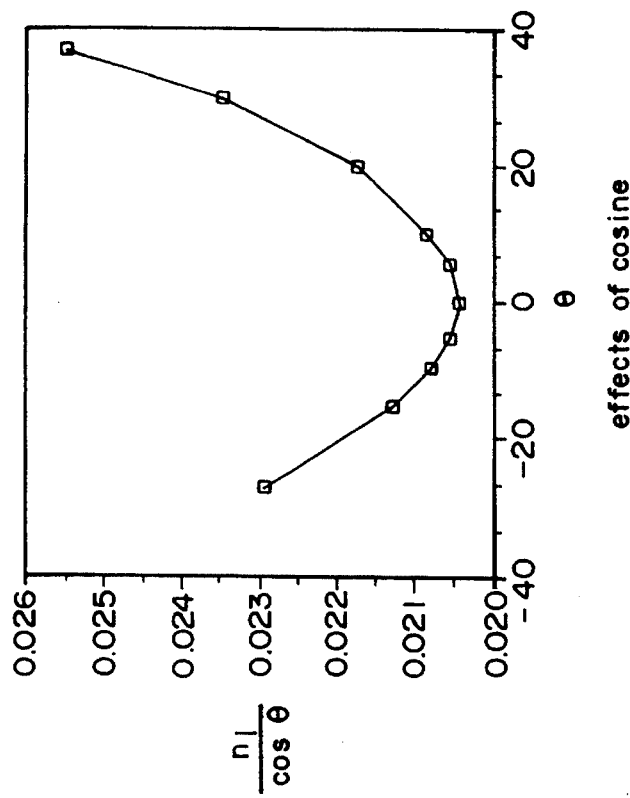
Figure 9B:
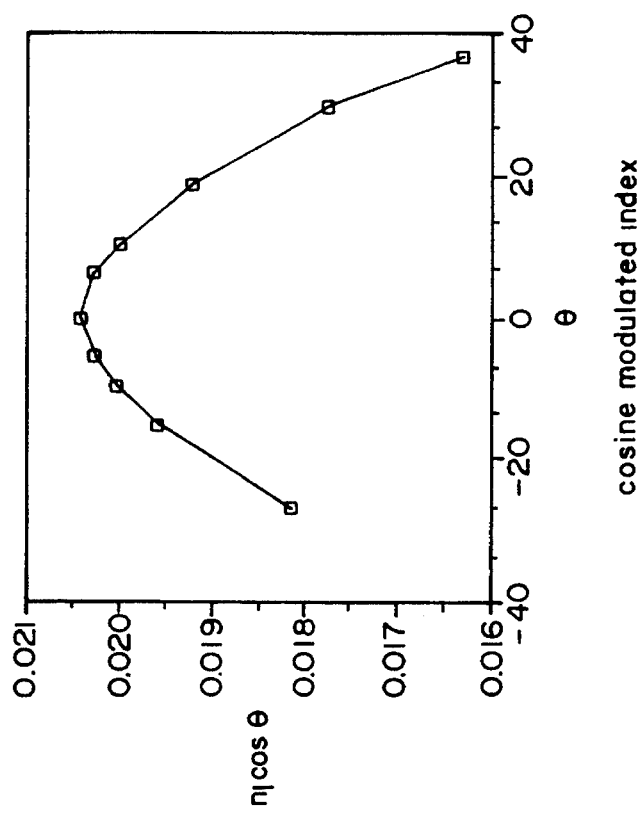
FIGS. 9a–9d show these same parameters of interest when the amplitude of the recording beam, across its profile, is varied in a particular manner.
Figure 9A:
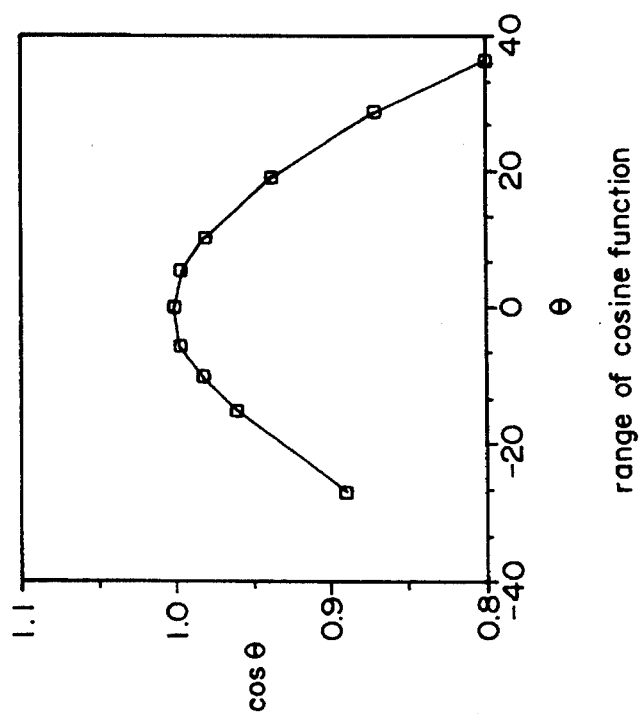
Figure 9D:
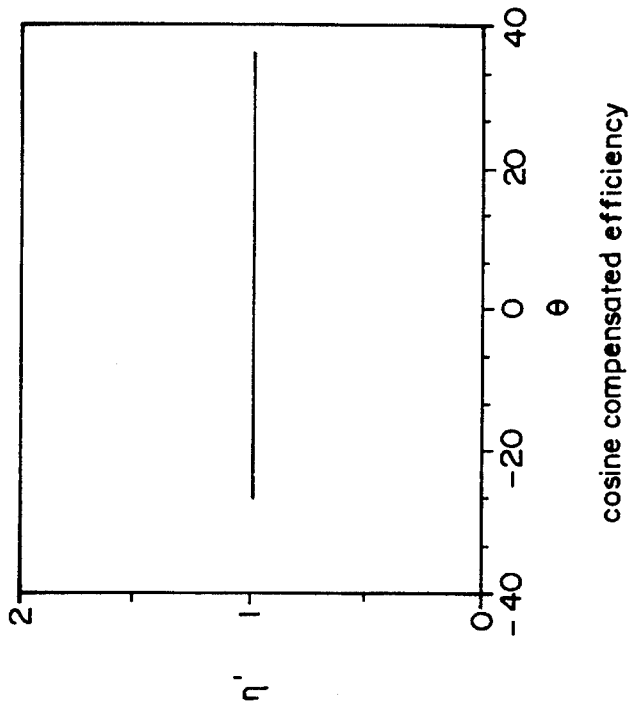
Figure 9C:
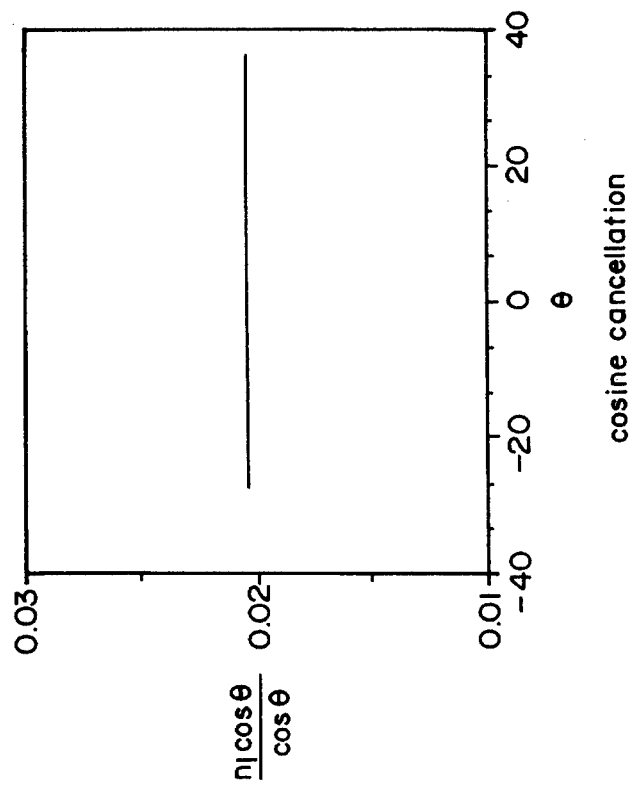

If $n_1$ is controlled so that it varies exactly with cos $\Theta$, then the argument of equation (22) remains constant and whatever efficiency was selected in the design will be maintained. FIGS. 8a–8d and 9a–9d show these parameters plotted for a 100 mm holographic optical element lens design, and the effect of controlling the $n_1$ to cancel the variations in efficiency attributed to varying $\Theta$. In particular, FIGS. 8a and 9a show the range of the recording angle $\Theta$ as master holographic element 28 is made, and the cosine of that angle. FIG. 8(b) shows a constant $n_1$ value, and FIG. 9(b) shows the value $n_1$ cos $\Theta$ plotted against $\Theta$. FIGS. 8(c) and 9(c) show the values $n_1$/cos $\Theta$ and $n_1$ cos $\Theta$/cos $\Theta$, respectively, plotted against $\Theta$; and FIGS. 8(d) and 9(d) show the efficiencies of the copy holographic element formed when the intensity of the recording beam is varied in the x,y direction according to the functions shown in FIGS. 8(b) and 9(b), respectively. As predicted by equation (22), when the intensity of the recording beam is kept constant in the x,y direction, the efficiency of the holographic element decreases, or rolls off, toward the edges of that element, as shown in FIG. 8(d). However, when that beam intensity is adjusted to compensate for changes in cos $\Theta$, such that the ratio of beam intensity/cos $\Theta$ remains constant, as shown in FIG. 9(c), the result is that the efficiency of the copy holographic element is also constant, as shown in FIG. 9(d).

The cos $\Theta$ modulation of $\Delta n$ is described by equation (23), where the intensity of the copy beam is varied as cos $\Theta$ and therefore the index change $n_1$, varies accordingly. This assumes that the relationship between $n_1$ and the recording energy is linear for the selected operating point, which is approximately 40 mJ/cm². The recording energy is given by the equation:

$$\text{Recording Energy} = |A|^2 \cos \Theta \cdot \Delta t \quad (24)$$

where $\Delta t$ is the exposure time, and $|A|^2$ is the peak intensity of the recording beam.

Figure 10:
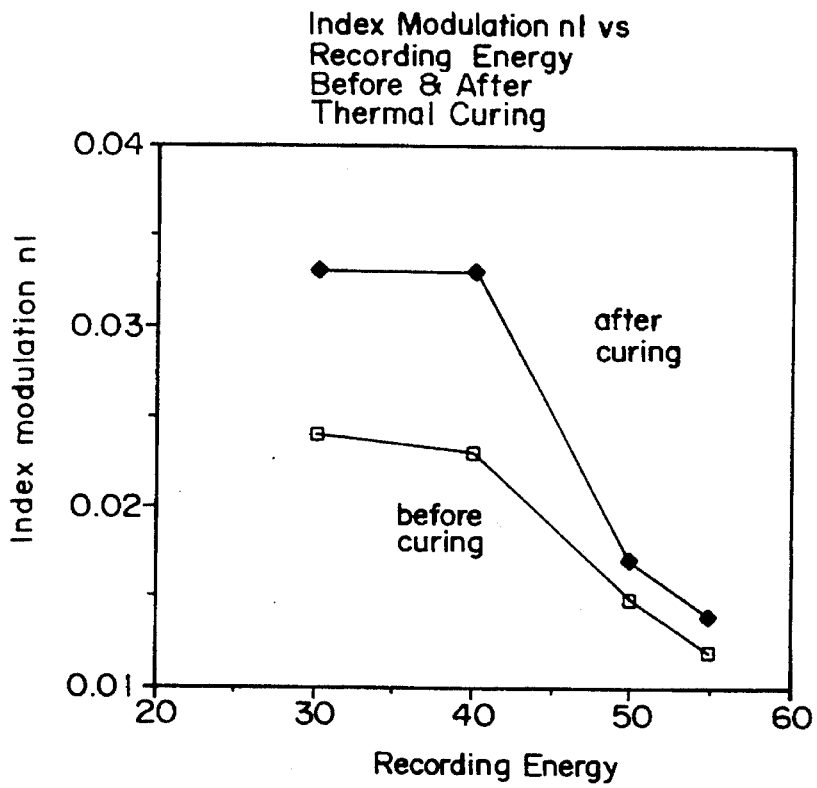
FIG. 10 demonstrates how the index modulation of the copy holographic element varies, both before and after the copy is cured, as a function of the energy of the recording beam.

The relationship between $n_1$ and the recording energy is described by the curves shown in FIG. 10, which, in particular, shows the index modulation of the photopolymer material both before and after thermal curing. While curing is not required, curing does produce a significant increase in the index modulation $n_1$, as shown by the curves of FIG. 10.

Figure 11:
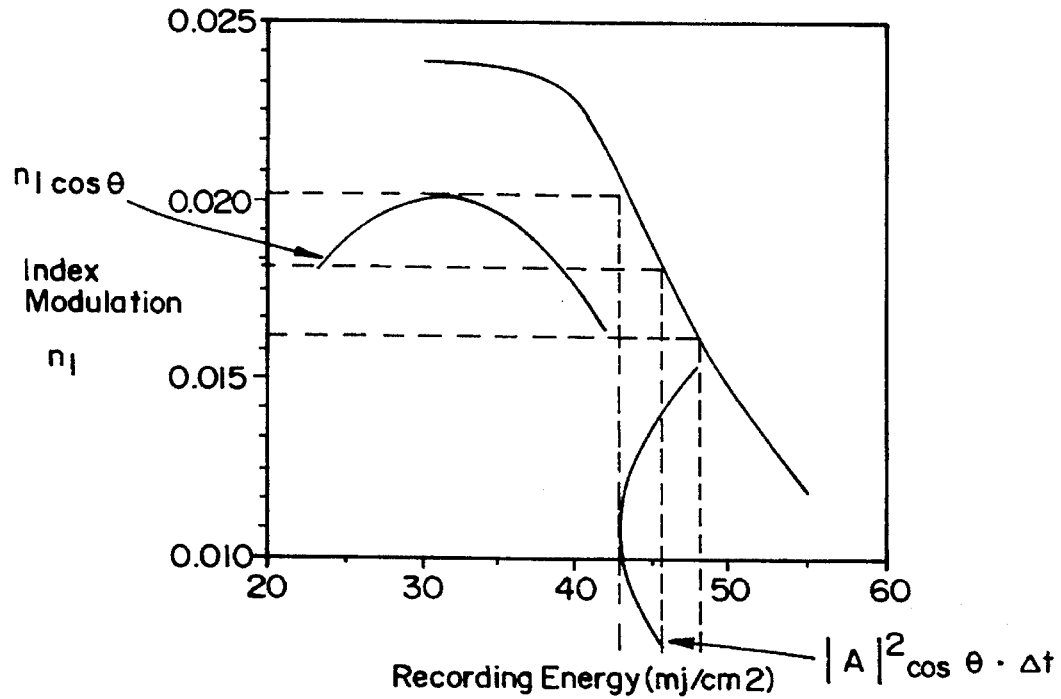
FIG. 11 illustrates the transfer characteristics for a replication design.
Figure 12:
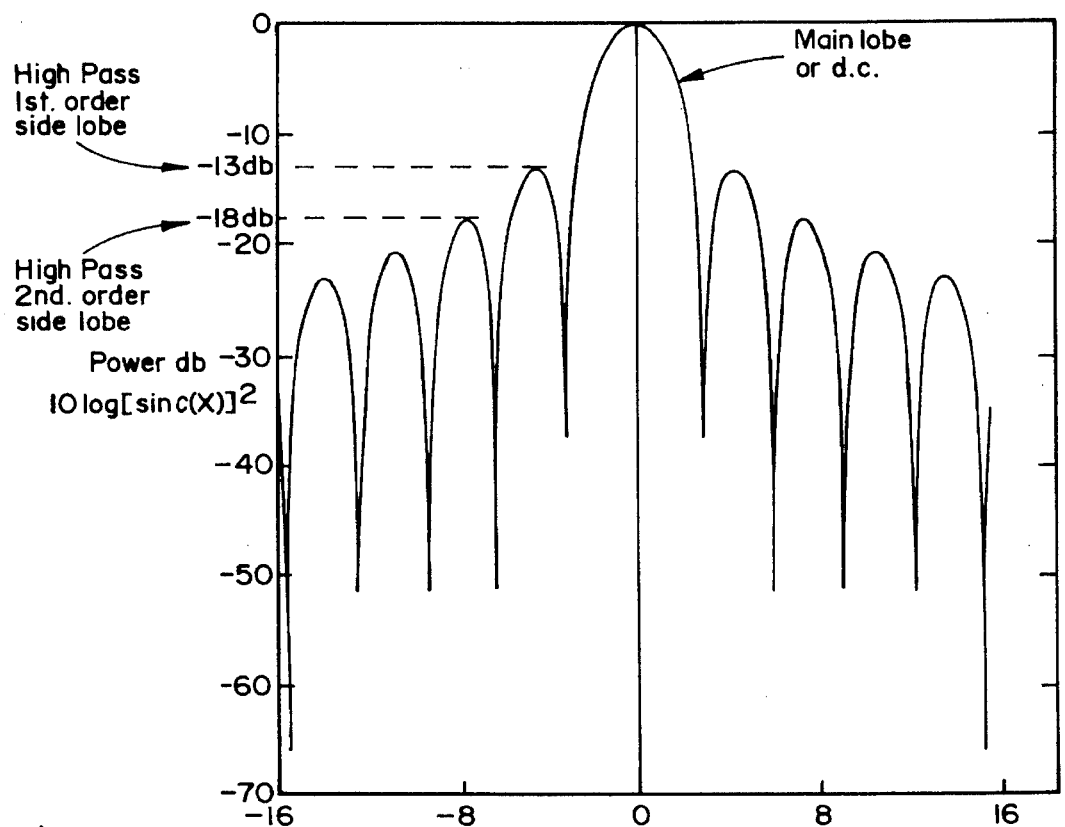
FIG. 12 shows the power spectrum of a matched filter made in the system of FIG. 4.

The transfer characteristics for a copy or replicate holographic optical element are shown in FIG. 11. The transfer characteristics for the thermally uncured replicate were taken from FIG. 10. The index change is shown along the ordinate of FIG. 11; and the energy of exposure, as calculated by equation (24), is shown along the abscissa of FIG. 11. The inverted beam profile intensity is taken from equation (23), which shows the axis off center, as dictated by the fact that the signal and reference beams used to fabricate the master recording, intersected at an angle of 10°. In practice, this profile is obtained by placing in the path of the replicate beam, an absorptive filter having transmission characteristics proportional to 1/cos $\Theta$. Such a filter can be made, for example, by exposing a AgHal plate to a light source that varies in intensity as the cos $\Theta$. The developed plate would then have a transmittance of 1/cos $\Theta$. The index modulation $n_1$ is then also modulated by the cos $\Theta$, as seen in FIG. 11. For practical purposes, a transfer curve would be generated for each new batch of replication material, to insure that this replication material is exposed to the replication beam for the desired time, to fabricate copy holographic elements having maximum efficiency and uniformity of performance.

The above discussion has concentrated on the use of replication for making holographic optical elements; however optical filters such as high pass matched filters may also benefit from this process, and it is believed that matched filter efficiency can be raised by at least 10 db. Taking a square object f(x,y) as an example for which a filter is to be made, the Fourier transform is taken and a high pass frequency response is selected to start at the first lobe (higher pass can be defined by going to 2nd or 3rd lobes or higher). The power spectrum, Ps, is given by:

$$Ps=|F(f(x,y))|^2 \quad (25)$$

Along one axis, say the x axis, the power spectrum, Ps(x), can be analytically written $$Ps(x)=|\sin cx|^2 \quad (26)$$

Equation (26) is plotted in FIG. 10, which shows that the first sidelobe is down 13 db, the second 18 db etc. For the high pass filter which is needed for discrimination, there is at least a 13 db decrease if the first lobe is used, and the decreases become greater as the frequency pass band becomes higher. In addition, from equation (3) it can be determined that if the filter is recorded using AgHal, the maximum efficiency due to absorption is 3.67%, which translates into an additional 14 db decrease. The loss due to high pass lobe selection cannot be eliminated, however, the absorptive losses can be reduced by using the methods of replication described above. If the filter replication works as well as that used in holographic optical element fabrication, it is believed that at least a 10 db increase in filter efficiency and a corresponding reduction in laser power requirements can be achieved.

Experiments were performed to increase the efficiency of multiple holographic lens arrays now presently fabricated using AgHal material on glass plates. The present multiple holographic lens arrays have an efficiency on the order of 2–3%; and by means of the replication process disclosed herein, these same AgHal multiple holographic lens arrays were transferred with augmented index modulation to Omnidex photopolymer, and the efficiency of 3×3 and 4×4 arrays was increased to 20–30% without a noticeable loss in quality.

The AgHal multiple holographic lens arrays were fabricated at 647 nm (using a Krypton laser) or at 633 nm (using a HeNe laser) at a 10 degree signal to reference beam angle. The arrays were created by a step and repeat exposure method as described earlier i.e., the photo sensitive material is exposed for the first location then the plate is moved a prescribed amount, exposed again, moved and re-exposed etc. for each location in the array.

Figure 13:
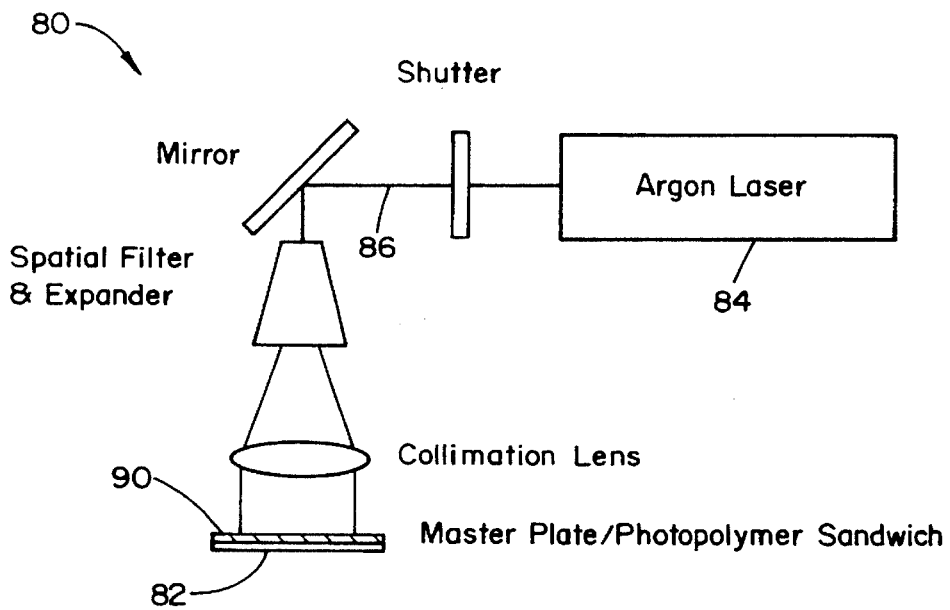
FIG. 13 is a schematic diagram of a laboratory test arrangement used to fabricate a copy holographic element in accordance with the present invention.

A schematic diagram of the laboratory test arrangement 80 is shown in FIG. 13. The Omnidex photopolymer 82 is sensitized for the blue-green region and therefor an Argon ion laser 84 emitting blue (488 nm) light was used as a light source. The raw laser beam 86 is spatially filtered, expanded and collimated. A single axis mount with the ability to rotate about the vertical axis, was used to mount the glass/AgHal master MHL array 90.

As indicated above, the photopolymer used in these experiments is sensitive only in the blue-green region, and therefore, a red lamp was used for illumination. The photopolymer was supplied on a mylar sheet substrate with a thin membrane protective cover material. When preparing the photopolymer for exposure this protective cover was peeled off and the photopolymer/mylar substrate was applied to the glass/AgHal master so that the photopolymer faced and came into intimate contact with the AgHal emulsion of the master plate. The photopolymer sheet was applied with the aid of a roller, starting from one end and rolling over the photopolymer sheet as it makes contact with the master plate to avoid entrapment of air bubbles, which may create voids between the emulsions. The glass plate AgHal master-photopolymer sheet sandwich was placed in the mount with the glass facing the laser beam source, and the plate sandwich was then exposed with the laser light source. After exposure, the photopolymer was fixed or cured by illuminating it with a UV light source; and typically, a 6–8 minute fixing time was used with a small black light (800 uw/cm$^2$). The fixed photopolymer with mylar substrate was then peeled away from the glass plate and evaluated for efficiency and optical quality.

Figure 14:
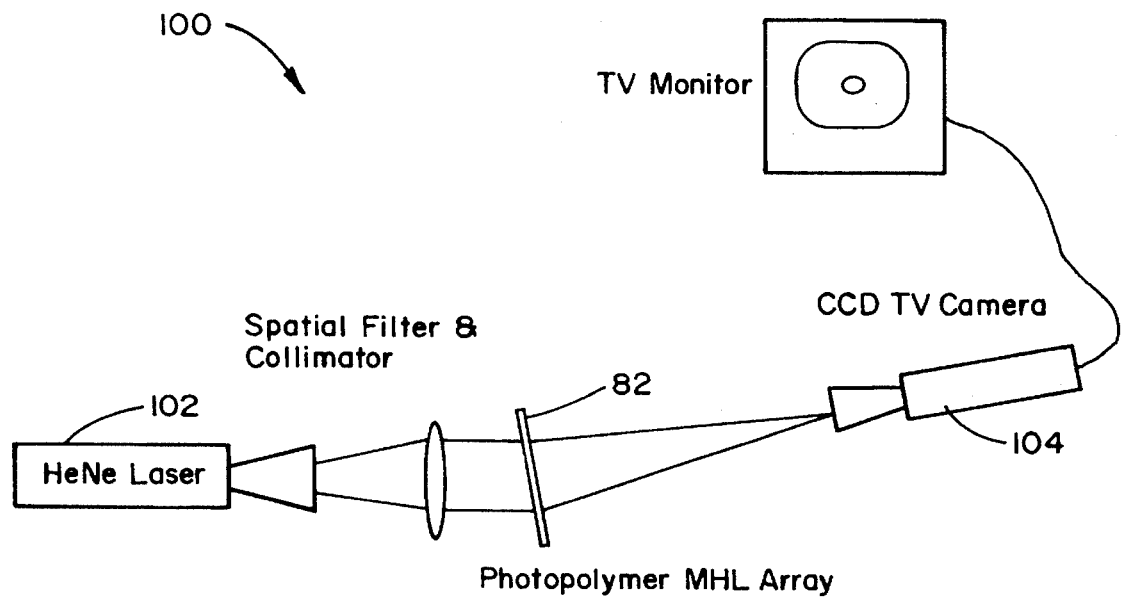
FIG. 14 is a schematic diagram of a laboratory arrangement used for evaluating the copy holographic element.
Figure 15:
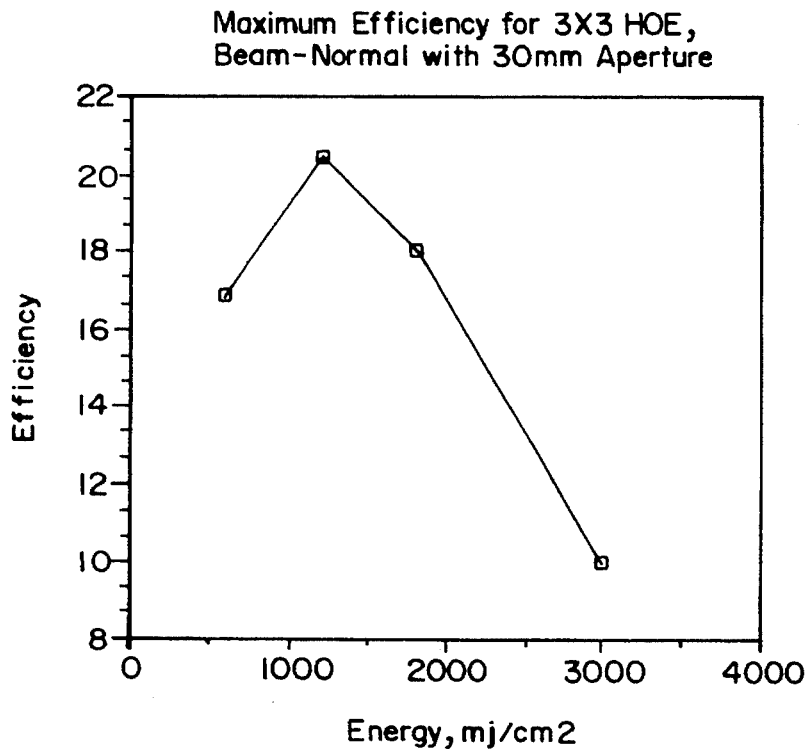
FIGS. 15 and 16 show how the efficiency of the copy holographic element varies as a function of the energy of the replicating beam, when the replication beam forms angles of zero and ten degrees, respectively, with the normal of the copy holographic element.
Figure 16:
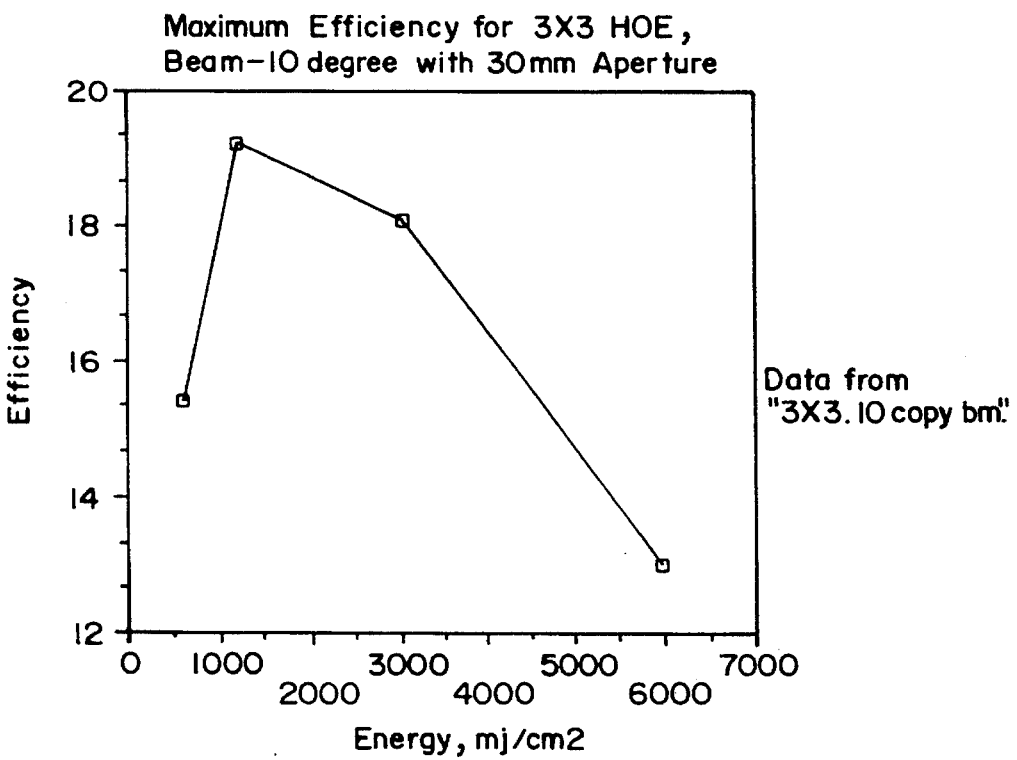

FIG. 14 shows a diagram of the laboratory arrangement 100 used for playing back and evaluating the augmented replicate optical element 82, using a laser source 102 having a wavelength of 633 nm, which is close to the wave length at which the master holographic element 90 was fabricated. It should be noted that the wave length of the replication beam is not the same nor does it have to be the same as the wavelength of the playback beam, because the replication beam is only used to form the replication element 82. For this evaluation, the photopolymer recording was mounted in a liquid gate (not shown) with a stage for rotation adjustment about the x and y axes (pitch and yaw). A CCD television camera 104 affixed to a bench microscope was used to view the focused diffraction pattern to evaluate the optical quality of the holographic optical element, while a J-16 radiometer (not shown) was used to measure the throughput power for purposes of determining the diffraction efficiency. A 10 mm circular aperture (not shown) was situated in front of the laser beam used for evaluating each multiple holographic lens array replication. The stage for the holographic optical element 82 was trimmed in while the resultant diffraction pattern was being viewed to obtain the best lens performance, then the power of the first order diffraction beam was measured.

The initial replication exposures were made over an area of approximately 94 cm$^2$ using a laser beam having a diameter of 30 mm and aligned normal to the plate (photopolymer medium) at a relatively high power density (10 mw/cm2). It was found that the playback angle at which maximum diffraction efficiency was achieved differed from that at which the best diffraction pattern occurred.

In subsequent testing, several exposures were made at different energies, with the angle of incidence of the copy beam set at the same angle as the master plate. Upon playback, it was found that the angle for best optical performance coincided closely with that for best diffraction efficiency. The copies were initially played back dry (that is, with no liquid gate), and while the diffraction efficiency was approximately an order of magnitude greater than the original master, the optical quality was not quite as good. It was considered that the replication with the Omnidex photopolymer might be only a surface phenomena, and therefore would disappear when the photopolymer is immersed in a matching liquid. However, when the Omnidex photopolymer was played back in an index matching liquid gate, it was found that the optical quality of the photopolymer improved so as to be nearly indistinguishable from the master multiple holographic lens array and the efficiency remained high, proving that the recording in question resided in the medium and is not a simple surface relief. However, the playback angle for best performance and diffraction efficiency showed some inconsistent variations from plate to plate. The mylar substrate for the photopolymer shows some birefringence and could have variations in thickness that may affect playback conditions and quality.

With reference to FIG. 13, the diameter of the collimated laser beam used in the replication process was increased to 100 mm in order to copy the full aperture of the master multiple holographic lens arrays. The maximum intensity achievable with the larger beam diameter was about 2.5 mw/cm$^2$. It was found that when the copy beam was normal to the master plate, the photopolymer copies had a broader range for the playback angle so that it was easier to find a good compromise and to achieve both good optical performance and good diffraction efficiency. When the copy beam angle was adjusted to coincide with the original fabrication angle of the master, the playback angle showed a narrow range of acceptance for good diffraction efficiency while the angle for good optical performance was inconsistent. Therefore, all large diameter copies were made normal to the replication beam.

Copies were made of a 3×3 master of 2.7% efficiency and a 4×4 master of 1.2% efficiency. Exposures of 10 minutes and 20 minutes at about 2.5 mw/cm$^2$ and 20 minutes and 40 minutes at about 1.2 mw/cm$^2$ were made with a UV fixing time of 3 to 6 minutes with the plate butted to the lamp face used in the curing process, covering ⅓ of the plate each 6 minutes to insure total curing. Peak efficiency ranged from 22% to 31% for the 3×3 multiple holographic optical element and 22.7% to 24.3% for the 4×4 multiple holographic optical element. These results are summarized by the curves and column graphs of FIGS. 13–16.

More specifically, FIGS. 13 and 14 show the efficiency of the replicate holographic element as a function of the recording energy for recording beam angles of zero and 10 degrees respectively. For these conditions, alignment was made for maximum efficiency with no attempt to optimize the airy pattern of the lens. From these data it appears that highest efficiency is obtained when the replication beam is normal to the recording plane. While this beam-normal condition seems to be the best, there may be advantages to off axis replications, such as diminution of higher orders as well as control of efficiency roll off.

Figure 17:
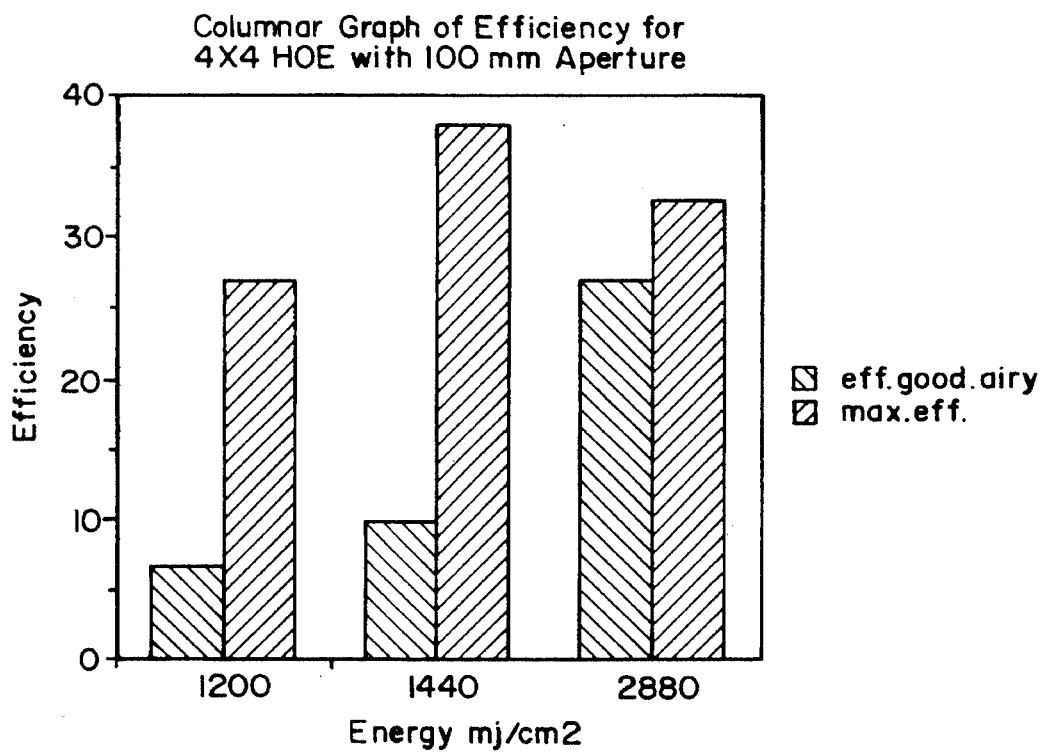
FIGS. 17 and 18 present the data of FIGS. 15 and 16 in columnar form.
Figure 18:
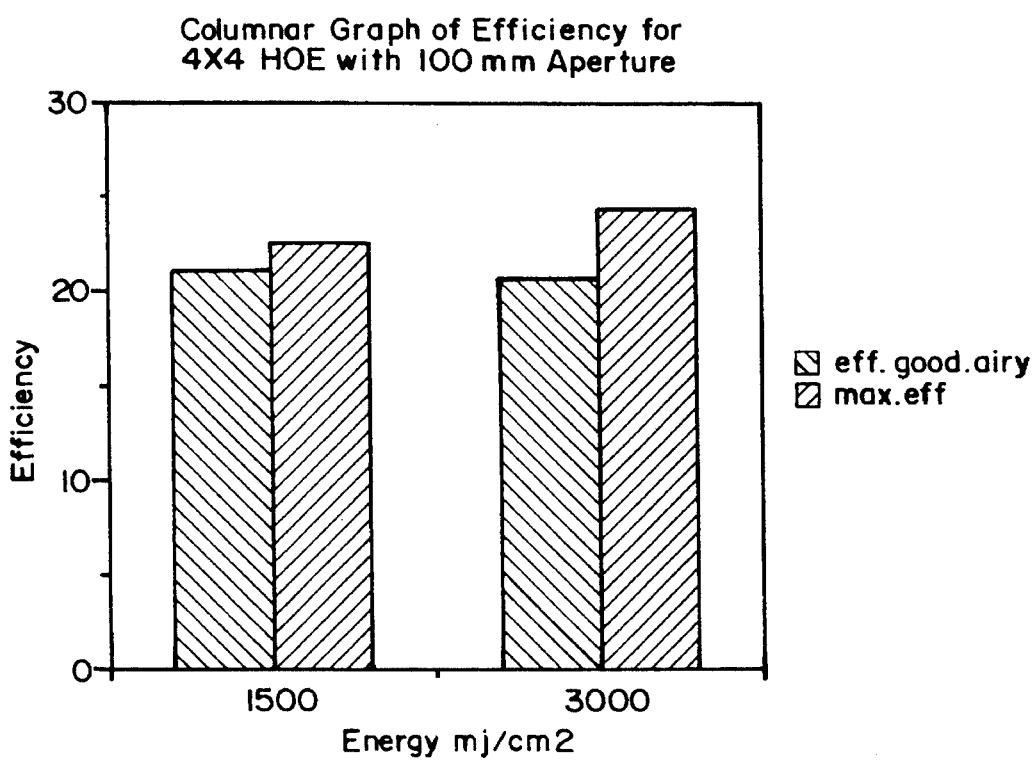

FIGS. 17 and 18 present the data in a columnar graph format for the large area (100 mm diameter) 3×3 and 4×4 MHLs under beam-normal conditions. FIG. 17 shows a high maximum efficiency of 38% with a poor airy pattern, compared to a maximum efficiency of 27.5% when the holographic optical element is adjusted for the good airy pattern at f/40. The columnar data shows that the 28% efficiency of the good airy pattern recording approaches the maximum efficiency of 32% at the 1990 mj/cm$^2$ exposure. If we determine the efficiency of the photopolymer by using the equation (22), it is seen that it is possible to obtain a number of exposure multiples that would yield similar efficiencies. With less data points, FIG. 18 shows the 4×4 HOE where the efficiency seems to remain in the low to mid 20% range for both cases. There is no doubt that the augmented holographic optical element efficiencies are concrete and repeatable.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

We claim:

1. A method of fabricating a multiple holographic element, comprising:

forming a master multiple holographic element having an absorption grating pattern producing a given index of refraction pattern across the master multiple holographic element, including the steps of i) transmitting a reference beam onto a planar surface of an optical recording medium, ii) transmitting a signal beam onto the planar surface of the recording medium, wherein the reference and signal beams interfere at the recording medium to form the master multiple holographic element from the optical recording medium, said master multiple holographic element having a non-uniform efficiency;

coating the master multiple holographic element with a layer of a photopolymer;

directing a recording beam to and through the master multiple holographic element and onto the photopolymer layer, wherein the absorption grating pattern of the master multiple holographic element modulates the amplitude of the recording beam, and the modulated recording beam forms the monomers of the photopolymer layer into a monomer pattern that produces said given index of refraction pattern across the photopolymer layer;

fixing the monomers of the photopolymer layer in said monomer pattern to form a copy of the master holographic element; and removing the photopolymer layer from the master multiple holographic element;

wherein the recording beam has an amplitude profile on the planar surface of the master multiple holographic element, and the directing step includes the step of varying said amplitude profile to compensate for the non-uniform efficiency of the master multiple holographic element and thereby to form the copy of the master multiple holographic element with a uniform efficiency.

2. A method according to claim 1, wherein the step of forming the master multiple holographic element further includes the step of forming the master multiple holographic element from a silver halide optical recording medium.

3. A method according to claim 1, wherein the coating step includes the steps of:

pouring a film of the photopolymer onto the master multiple holographic element; and curing the photopolymer film on the multiple holographic element.

4. A method according to claim 1, wherein the coating step includes the step of rolling a cured layer of the photopolymer onto the master multiple holographic element.

5. A method according to claim 4, wherein said output beam includes a plurality of component output beams including a zero order output beam and a first order output beam, and wherein:

the monitoring step includes the step of monitoring the intensity of the first order output beam; and the terminating step includes the step of terminating the directing step when the intensity of the first order output beam falls below a given level.

6. A method according to claim 1, wherein:

the master multiple holographic element has a given efficiency; and said copy of the master multiple holographic element has an efficiency greater than said given efficiency.

7. A method according to claim 1, wherein the directing step includes the steps of:

passing the recording beam through the photopolymer, wherein the recording beam forms an output beam;

monitoring the intensity of the output beam; and terminating the directing step when the intensity of the output beam reaches a given level.

* * * * *